United States Patent

[11] 3,548,879

[72] Inventor Werner Wilde
  Ziegelhausen-Peterstal, Germany
[21] Appl. No. 774,995
[22] Filed Nov. 12, 1968
[45] Patented Dec. 22, 1970
[73] Assignee Teldix GmbH
  Heidelberg, Germany

[54] THREE-WAY VALVE
  16 Claims, 5 Drawing Figs.
[52] U.S. Cl............................................. 137/637.1,
  137/596.18, 137/625.66, 137/627.5, 137/637.2
[51] Int. Cl........................................E03b, E03c F17d
[50] Field of Search.......................................... 137/627.5,
  112, 119, 625.66, 637.2, 596.15, 596.18, 625.12,
  625.11, 625.6, 625.63, 625.27, 625.42, 627;
  251/61

[56] References Cited
UNITED STATES PATENTS

| 2,945,726 | 7/1960 | Stelzer............... | 251/61X |
| 3,008,516 | 11/1961 | Weiss................ | 137/637.2X |
| 3,042,072 | 7/1962 | Humphrey........... | 251/61X |
| 3,268,270 | 8/1966 | Bailey................ | 137/627.5 |
| 3,294,120 | 12/1966 | Ruchser.............. | 137/627.5 |
| 3,415,284 | 12/1968 | Stampfli.............. | 137/625.66 |
| 3,429,327 | 12/1969 | Wright................ | 137/112 |

Primary Examiner—Clarence R. Gordon
Attorney—Spencer and Kaye

ABSTRACT: A three-way valve having two individually controllable valve elements. The valve elements each cooperate with one of two separate valve seats which are arranged on a common axis. Means are provided to maintain one of the valve elements in the closed position when the other valve element is fully opened.

3,548,879

THREE-WAY VALVE

BACKGROUND OF THE INVENTION

The present invention relates to a three-way valve which is suitable, for example, for controlling a pressure medium actuated (e.g. hydraulic) piston and cylinder. The three-way valve comprises two individually controllable valves one of which is disposed between the source of the pressure medium and the working cylinder and the other between the working cylinder and the pressure medium sink or outlet. The first of these valves will hereinafter be called the "inlet valve" while the second will be called the "outlet valve."

More particularly, the three-way valve to which the present invention relates has an inlet valve including a valve seat and an independently controllable valve element and an outlet valve including a valve seat and an independently controllable valve element. The three-way valve is therefore not of the type having one of the valve elements rigidly connected to the other; rather, when the three-way valve is used to control a working cylinder and piston, as described above, it can connect the working cylinder either with the pressure source or with the pressure sink, or can isolate the working cylinder from either the source or the sink. The three-way valve therefore knows three states of operation and makes it possible, by momentarily opening only the inlet valve or only the outlet valve, to produce a stepped change in the pressure in the working cylinder.

When the three-way valve of the type to which the present invention relates is used to control a working piston and cylinder, it is especially important that the pressure source not be directly connected to the pressure sink; that is, that the three-way valve not be operated in a fourth state wherein both the inlet and the outlet valves are fully open.

SUMMARY OF THE INVENTION

It is therefore an object of the present invention to provide a three-way valve of the type having an independently controllable inlet valve and outlet valve with a simply constructed mechanical lock which will hold the outlet valve closed when the inlet valve is open.

This object, as well as other objects which will become apparent in the discussion that follows, is achieved, according to the present invention, by arranging the two valve seats on a common axis and providing a mechanical element, interconnecting the valve element of the inlet valve and the valve element of the outlet valve, which determines the distance between them. Thus, if the two valve seats on the common axis are arranged to face away from each other, the mechanical locking element may be simply a loose pull connection, extending from one of the valve elements to the other, which limits the distance between the valve elements.

The coaxial arrangement of the valve seats is especially advantageous since it allows the body of the three-way valve to be constructed substantially of lathe-turned parts which, when assembled, form an extremely compact unit.

The pull connection between the valve elements could, for example, be simply a short piece of cable. It is more advantageous, however, to simultaneously employ this pull connection to actually guide the valve elements. It is therefore proposed to use a rod as the pull connection. This rod is extended into an opening in at least one of the valve elements so as to hold this valve element in the radial direction but allow it to move in the direction of the common axis of the valve seat. The rod is then provided with an abutment which limits the possible axial displacement with respect to this valve element, and connected to the other valve element.

According to a particular feature of the three-way valve according to the present invention, the positions of the two valve elements are individually controlled by separate pressure-sensitive elements. This arrangement makes it possible to control the valve elements without inserting a valve element stem into the sealed valve chamber of the three-way valve from the outside.

As is known, it is difficult to manufacture a valve having longitudinally displaceable components since the mechanical members which actuate the valve elements must extend into a sealed housing. These difficulties of construction are avoided if, according to the present invention, the two valve elements are connected to separate pistons or diaphragms which can be individually moved by the pressure differentials between their two sides.

In particular, if the three-way valve according to the present invention is employed to control a working piston and cylinder in the manner described above, the valve element which forms the inlet valve portion of the three-way valve is fastened to a movable double piston or diaphragm; i.e., a piston or diaphragm having a double wall. The wall portion of this double wall which faces the valve element has a smaller external diameter than the other wall. This arrangement permits the inlet valve to be opened when the pressure from the pressure source is applied only to the inlet chamber. When the pressure is applied to both walls of this double wall, the inlet valve will close.

Although the double wall can, for example, take the form of a differential piston, it has proven particularly advantageous to use a double diaphragm having a sealed, pressure-free space between the two diaphragms.

The valve element which forms a part of the outlet valve can also be connected with a piston or a diaphragm. This piston or diaphragm too can be moved by selectively connecting one side thereof to the pressure source.

Finally, according to a still further feature of the present invention, the inlet valve element is biased in the open direction by means of a spring which acts on the inlet valve element and/or the double diaphragm so as to maintain it in the open position in the absence of pressure. This arrangement prevents incoming fluid from exerting a closing pressure on the inlet valve element when the pressure at the pressure source and, in turn, at the working piston and cylinder is initially rapidly increased.

DESCRIPTION OF THE PREFERRED EMBODIMENTS

Figure 1:
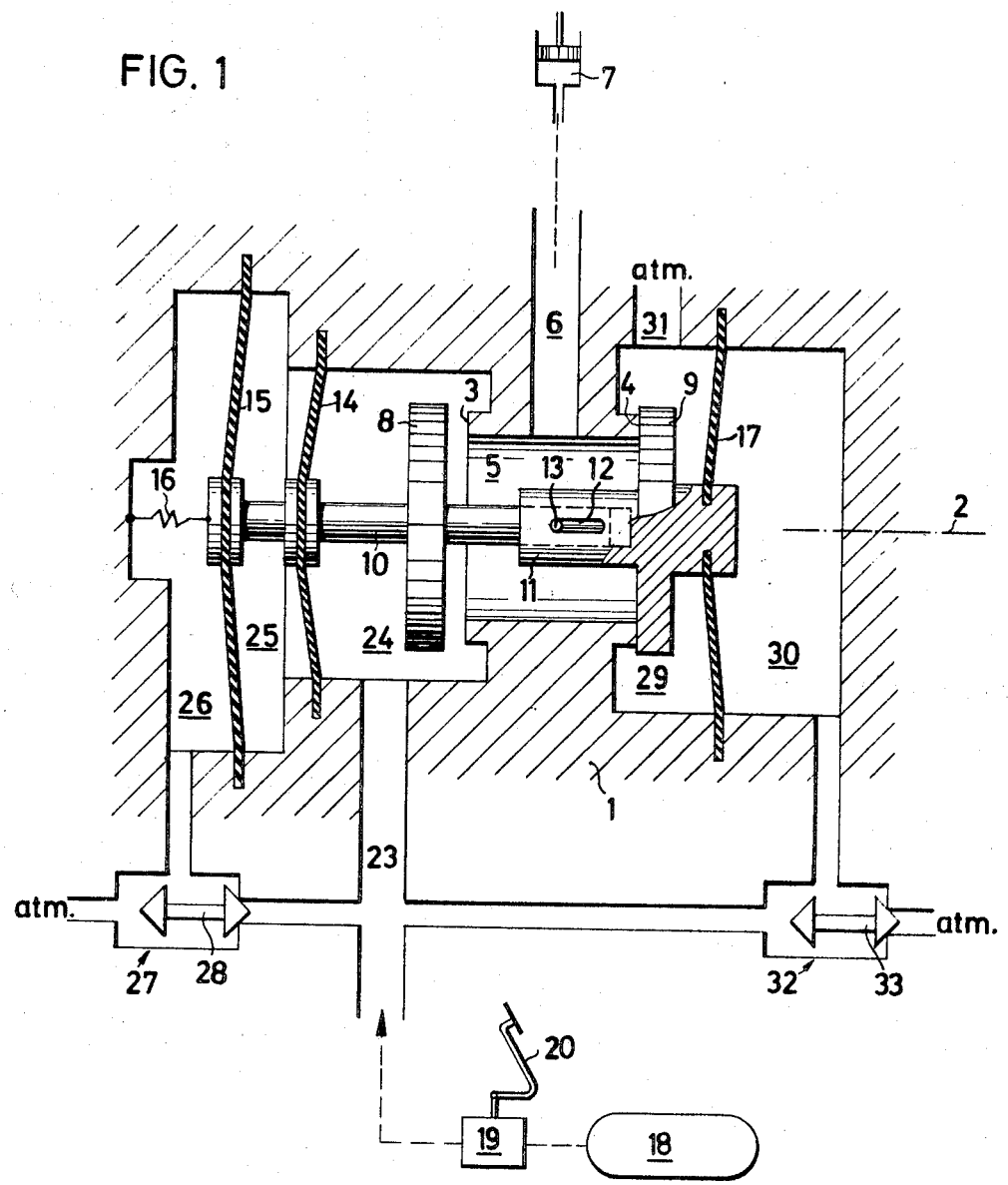
FIG. 1 is a schematic diagram of a three-way valve according to a preferred embodiment of the present invention. In this embodiment, the two valve elements are controlled with the aid of the same pressure which the three-way valve is itself employed to control.
Figure 2:
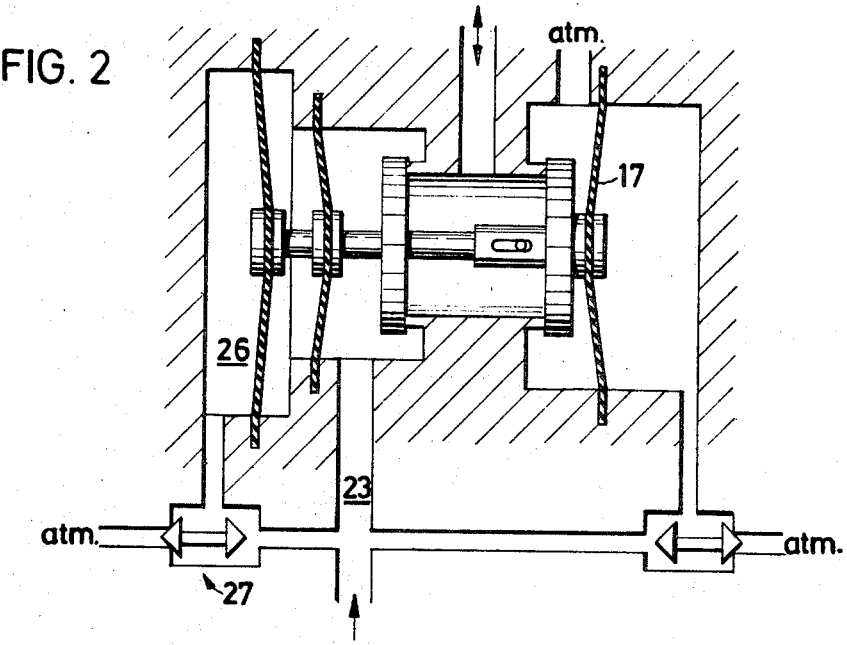
FIG. 2 is a schematic diagram of the three-way valve of FIG. 1 in another operating position.
Figure 3:
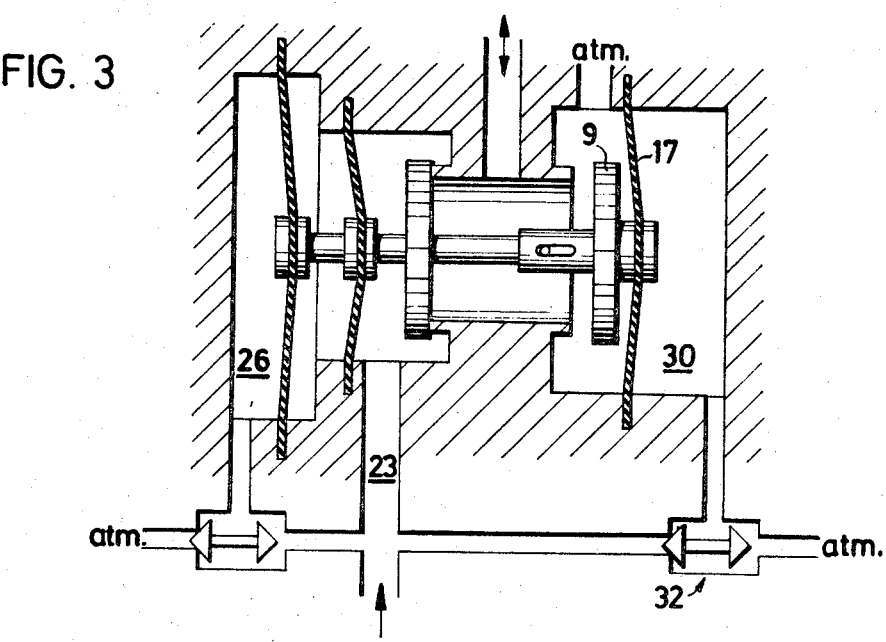
FIG. 3 is a schematic diagram of the three-way valve of FIG. 1 in a still further operating position.

Referring now to the drawings, FIGS. 1, 2 and 3 illustrate the three-way valve according to a preferred embodiment of the present invention in various positions of operation. Due to its short response time and its compact construction, this valve is particularly suitable for use as a pressure-control unit within a hydraulic brake-control system for preventing the braked wheels of a motor vehicle from locking.

In FIG. 1 the basic element 1, which is shown by hatching, is rotationally symmetric about the axis 2 shown in dotted lines. In the center there are two valve seats 3 and 4 which face away from each other. A channel 6 extends radially outwardly from the central bore 5 which connects the valve seats 3 and 4. As shown in broken lines, this channel leads to one or a plurality of wheel brake cylinders 7. Disc-shaped valve elements 8 and 9 cooperate with the valve seats 3 and 4 to form the inlet and outlet valves, respectively. The inlet valve element 8 is fastened to a rod or spindle 10, which passes coaxially through it. Its right end projects into a sleeve-shaped extension 11 of the outlet valve element 9. This extension has two longitudinal slits 12 which allow a transverse pin 13 of spindle 10 to move back and forth.

On the other end of the spindle 10 are fastened two diaphragms 14 and 15. The one diaphragm 14, disposed closer to the valve element 8, has a smaller diameter than the other diaphragm 15. A weak tension spring disposed between the end of spindle 10 and the left frontal face of the base element 1 pulls the spindle to the left to maintain the inlet valve element 8 in the open position in the absence of pressure. Due to the transverse pin 13 and sleeve 11, the outlet valve element 9 is simultaneously pulled toward its seat 4.

A diaphragm 17 is also fastened to the outlet valve element 9. The three diaphragms can consist, for example, of fabric-reinforced rubber. They are firmly clamped into housing or base element 1 at their outer edges so that they form tight separating walls between the individual chambers of the three-way valve.

The operation of the three-way valve shown in FIGS. 1 to 3 will now be described in connection with its function as a control unit in the brake control system shown in FIG. 1. In addition to the wheel brake cylinder 7 mentioned above, connected to the channel 6, this brake control system includes a pressurized air tank 18, which is automatically kept at an approximately constant pressure by means of a compressor, and a brake pedal actuated brake valve 19. The brake pedal is designated with the numeral 20. The brake valve is connected to the main control line 23, as shown in dashed lines. This control line opens into the so-called "inlet chamber" 24 of the three-way valve; from there the pressure medium can pass through the open inlet valve to the brake cylinder 7.

The space enclosed by the double diaphragm 14, 15 (i.e., 25 is tightly sealed and contains a gas at atmospheric pressure. On the left of the double diaphragm is the "inlet precontrol chamber" 26 which can be selectively connected, by means of a precontrol valve 27 to the main control line 23 or to the outside atmosphere. In FIG. 1 the valve element 28 of the precontrol valve is in its right-hand position so that chamber 26 is open toward the outside atmosphere (indicated by the abbreviation "atm."). Correspondingly, diaphragm 17 divides the right portion of the base element 1 into an "outlet chamber" 29 and an "outlet precontrol chamber" 30. The outlet chamber is connected to the outside atmosphere via a channel 31. The precontrol chamber 30 can also be selectively connected, by means of a second precontrol valve 32, with either the main control line 23 or with the outside atmosphere. The valve element 33 is shown in its right-hand position wherein the precontrol chamber 30 is connected with the main control line 23. Both precontrol valves 27 and 32 can, for example, be actuated by electromagnets.

FIG. 1 shows the three-way valve and the precontrol valves in their normal positions. When the brake pedal 20 is depressed, the pressure medium (e.g. air) flows into chamber 24 through the main control line 23. Since the inlet valve is open, this medium continues to flow to the brake cylinder 7 and simultaneously, via the precontrol valve 32, to the precontrol chamber 30 of the outlet valve. The brake and control pressure thus quickly builds up in all these chambers. Since the left side of the diaphragm 17 is at atmospheric pressure, this diaphragm presses the outlet valve body 9 firmly against the seat 4. Moreover, the double diaphragm 14, 15 pulls the spindle 10 to the left thus exerting a further force on the outlet valve body.

If valve element 28 of the precontrol valve 27 is moved to the left-hand position as shown in FIG. 2, the pressure medium will flow into the precontrol chamber 26 and the double diaphragm 14, 15 (the left side being of larger diameter than the right) will press the inlet valve element shut. The freedom of movement provided by the transverse pin 13 and the slits 12 permits this action to occur without influence on the position of the outlet valve. Thus, both the inlet and outlet valves will now be closed and the pressure in the brake cylinder maintained independently of any increase or reduction of the pressure in the control line 23.

With the third valve position combination shown in FIG. 3, the brake pressure in the brake cylinder 7 will be reduced. When the valve element 33 of the precontrol valve 32 is moved to the left-hand position, the pressure in the precontrol chamber 30 will first escape to the outside. Consequently, the brake pressure itself will lift the outlet valve element 9 from its seat and escape via the outlet chamber 29.

It may therefore be seen that the movements of the inlet and outlet valves operate independently of each other, except for the fact that the outlet valve cannot be opened as long as the inlet valve is fully open. Thus, when the three-way valve is employed, as shown in FIG. 1, to control the pressure applied to a wheel brake cylinder in a brake control system for preventing wheel locking, the pressure medium will never by allowed to flow directly through the inlet and outlet valves to the outside atmosphere. Rather, particularly when the system for preventing wheel locking malfunctions, for example due to a fault in the electrical valve element control of the precontrol valve 32, the outlet valve will remain closed and the brake effective as long as the precontrol valve 27 is in the position shown in FIG. 1 and sufficient control pressure is available. A break in diaphragm 17 or in one of diaphragms 14 or 15 will also have no influence on the position of the outlet valve element 9. This valve element will remain shut after such a malfunction as well.

The spring 16 shown in FIG. 1 is not shown in FIGS. 2 and 3 to indicate that it is not absolutely necessary for the operation of the three-way valve. It can be replaced, for example, by a suitably constructed elastic double diaphragm.

Figure 4:
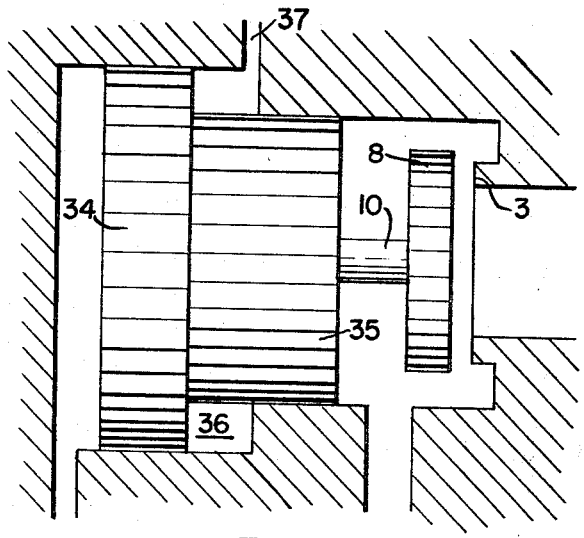
FIG. 4 is a schematic diagram of a portion of the three-way valve according to a second preferred embodiment of the present invention.

FIG. 4 shows how the embodiment of the three-way valve illustrated in FIG. 1 can be modified so that the inlet valve element is operated by a differential piston. In this case, the diaphragms 14 and 15 are replaced by a single piston having two regions 34 and 35 of differing diameter. This differential piston is connected to the inlet valve element 8 by means of the spindle 10 and is operative, when identical pressure is applied to both sides thereof, to maintain the inlet valve element against its corresponding seat. An orifice 37 may connect the annular chamber 36, which is constituted by the differential piston and the basic element 1, with atmosphere.

Figure 5:
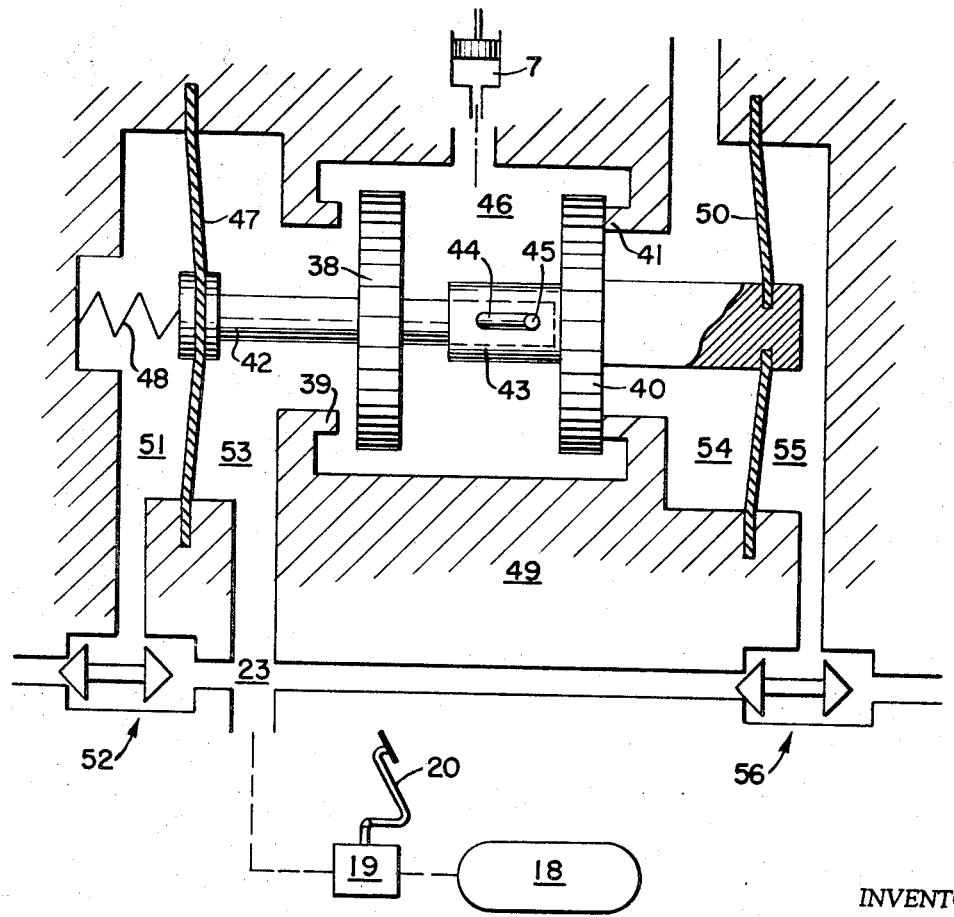
FIG. 5 is a schematic diagram of the three-way valve according to a further preferred embodiment of the present invention.

The three-way valve according to the present invention may also be constructed with the two valve seats facing toward each other as shown in FIG. 5. In this embodiment, the inlet valve element 38 is operative, when in the fully open position away from the inlet valve seat 39, to maintain the outlet valve element 40 against its corresponding seat 41. This is accomplished, in the manner described above in connection with FIG. 1, with a spindle 42, a sleeve-shaped extension 43 with two slots 44, and a pin 45. These members are arranged in the chamber 46 to connect the two valve elements and maintain the outlet valve element a minimum distance away from the inlet valve element. On the other hand end of the spindle 42 is fastened a diaphragm 47, the diameter of which is greater than the diameter of the inlet valve seat. A pressure spring 48 is disposed between the diaphragm 47 and the left frontal face of a base element 49, which is shaped similar to the base element 1 in FIG. 1. The spring presses the spindle 42 to the right to maintain the inlet valve element 38 in the open and the outlet valve element 40 in the closed position in the absence of pressure. A diaphragm 50 is also fastened to the outlet valve element. The diaphragm 47 divides the left position of the base element into an inlet precontrol chamber 51, which is connected to a precontrol valve 52 similar to FIG. 1, and into an inlet chamber 53, connected to the main control line 23. On the right side of the base element there are an outlet chamber 54, open to atmosphere, and an outlet precontrol chamber 55, connected to a precontrol valve 56. In operation the precontrol valves must work in an opposite function in comparison with FIG. 1. Normally chamber 51 is connected with the main control line 23, so that the pressure medium may flow to the brake cylinder via the open inlet valve, and chamber 55 is connected with atmosphere allowing the outlet valve to be closed by the main pressure itself. If the pressure in the brake cylinder 7 is to be held constant, the chamber 51 is connected with atmosphere via precontrol valve 52, so that the inlet valve is closed. Finally the outlet valve may be opened by connecting the chamber 55 with the main pressure line. In this position the diaphragm 50 presses not only on the outlet valve element 40, but also on the inlet valve element 38 closing the last named according to the invention.

It will be understood that the above description of the present invention is susceptible to various modifications, changes and adaptations.

I claim:

1. A three-way, three-position valve comprising, in combination:
   a. two valve seats arranged in a common axis and facing away from each other;
   b. a first individually controllable valve element arranged to selectively close one of said valve seats;
   c. a second individually controllable valve element arranged to selectively close the other of said valve seats; and
   d. means interconnecting said first and said second valve elements for limiting the distance between them, thereby to maintain one of said valve elements in the closed position when the other of said valve elements is fully open.

2. The three-way valve defined in claim 1, further comprising first pressure control means for controlling the position of said first valve element and second pressure control means for controlling the position of said second valve element.

3. The three-way valve defined in claim 2, further comprising first inlet-outlet means for directing a pressure medium to and from both of said valve seats via one side of said valve seats, second inlet-outlet means for directing a pressure medium to and from one of said valve seats via the other side of said one valve seat and third inlet-outlet means for directing a pressure medium to and from the other of said valve seats via the other side of said other valve seat.

4. The three-way valve defined in claim 3, wherein said distance-limiting means includes rod means arranged to extend into at least one of said first and said second valve elements, said rod means being movable in the direction of said common axis with respect to said at least one valve element, and abutment means, connected to said rod means, for limiting the movement between said rod means and said at least one valve element.

5. The three-way valve defined in claim 4, wherein said first pressure control means includes:
   a. first means, connected to said first valve element, for moving said first valve element between open and shut positions, said first means having a first wall forming a movable wall of a first pressure chamber and a second wall forming a movable wall of a second pressure chamber, said second wall having a larger area than said first wall;
   b. second means connecting said first pressure chamber to a source of first pressure; and
   c. third means for selectively connecting said second pressure chamber to said source of first pressure and to a source of second pressure, said second pressure being lower than said first pressure.

6. The three-way valve defined in claim 5, wherein said first means includes a differential piston.

7. The three-way valve defined in claim 5, wherein said first wall is formed by a first diaphragm and said second wall is formed by a second diaphragm, said first and second diaphragms being arranged on a common axis and forming a sealed, pressure-free space between them.

8. The three-way valve defined in claim 4, further comprising at least one diaphragm for guiding the movements of said first and said second valve elements in the direction of said common axis.

9. The three-way valve defined in claim 7, further comprising means for biasing said first valve element in the open position, said first pressure control means controlling the position of said first valve element being operative to selectively close said first valve element.

10. The three-way valve defined in claim 9, wherein said biasing means is a spring.

11. The valve element defined in claim 9, wherein said biasing means is said first and said second diaphragm.

12. A three-way, three-position valve comprising, in combination:
   a. two valve seats arranged on a common axis;
   b. a first individually controllable valve element arranged to selectively close one of said valve seats;
   c. a second individually controllable valve element arranged to selectively close the other of said valve seats; and
   d. means interconnecting said first and said second valve elements for holding one of said valve elements in the closed position when the other of said valve elements is fully open.

13. The three-way valve defined in claim 12, wherein said interconnecting means permits relative movement of said valve elements with respect to one another along the common axis and limits the distance between said valve elements to a predetermined range.

14. The three-way valve defined in claim 13, wherein said two valve seats face away from each other, and said holding means includes means for limiting the distance between said valve elements.

15. The three-way valve defined in claim 13, wherein said two valve seats face toward each other and said holding means includes means for maintaining one of said valve elements a prescribed distance from the other of said valve elements.

16. The three-way valve defined in claim 1, wherein said interconnecting means permits relative movement of said valve elements with respect to one another along the common axis and limits the distance between said valve elements to a predetermined range.